(12) United States Patent
Schuette

(10) Patent No.: US 8,446,729 B2
(45) Date of Patent: May 21, 2013

(54) MODULAR MASS STORAGE SYSTEM AND METHOD THEREFOR

(75) Inventor: Franz Michael Schuette, Colorado Springs, CO (US)

(73) Assignee: OCZ Technology Group Inc., San Jose, CA (US)

( * ) Notice: Subject to any disclaimer, the term of this patent is extended or adjusted under 35 U.S.C. 154(b) by 667 days.

(21) Appl. No.: 12/713,349

(22) Filed: Feb. 26, 2010

(65) Prior Publication Data

US 2010/0241799 A1 Sep. 23, 2010

Related U.S. Application Data

(60) Provisional application No. 61/162,488, filed on Mar. 23, 2009.

(51) Int. Cl.
*H05K 1/00* (2006.01)

(52) U.S. Cl.
USPC ............. 361/748; 361/752; 361/760; 710/11; 710/301; 235/441; 235/492; 439/64; 439/660; 711/103; 711/105; 711/115

(58) Field of Classification Search
USPC ..... 361/748, 752, 760; 710/11, 301; 235/441, 235/492; 439/64, 660; 711/103, 105, 115
See application file for complete search history.

(56) References Cited

U.S. PATENT DOCUMENTS

| | | | |
|---|---|---|---|
| 5,748,912 A * | 5/1998 | Lee | 710/301 |
| 6,003,100 A * | 12/1999 | Lee | 710/301 |
| 7,114,659 B2 * | 10/2006 | Harari et al. | 235/492 |
| 7,367,503 B2 * | 5/2008 | Harai et al. | 235/441 |
| 8,310,836 B2 * | 11/2012 | Schuette | 361/760 |
| 2005/0230484 A1 * | 10/2005 | Cuellar et al. | 235/492 |
| 2008/0082731 A1 * | 4/2008 | Karamcheti et al. | 711/103 |
| 2008/0082734 A1 * | 4/2008 | Karamcheti et al. | 711/103 |
| 2008/0191033 A1 * | 8/2008 | Cuellar et al. | 235/492 |
| 2010/0267419 A1 * | 10/2010 | Nishizawa et al. | 455/558 |
| 2011/0320690 A1 * | 12/2011 | Petersen et al. | 711/103 |
| 2012/0304455 A1 * | 12/2012 | Schuette | 29/604 |

OTHER PUBLICATIONS

Fusion-io web page; ioDrive; 3 pages; 2010.

* cited by examiner

*Primary Examiner* — Xiaoliang Chen
(74) *Attorney, Agent, or Firm* — Hartman Global IP Law; Gary M. Hartman; Domenica N.s. Hartman

(57) ABSTRACT

A modular mass storage system and method that enables cableless mounting of ATA and/or similar high speed interface-based mass storage devices in a computer system. The system includes a printed circuit board, a system expansion slot interface on the printed circuit board and comprising power and data pins, a host bus controller on the printed circuit board and electrically connected to the system expansion slot interface, docking connectors connected with the host bus controller to receive power and exchange data therewith and adapted to electrically couple with industry-standard non-volatile memory devices without cabling therebetween, and features on the printed circuit board for securing the memory devices thereto once coupled to the docking connectors.

13 Claims, 2 Drawing Sheets

MODULAR MASS STORAGE SYSTEM AND METHOD THEREFOR

CROSS REFERENCE TO RELATED APPLICATIONS

This application claims the benefit of U.S. Provisional Application No. 61/162,488, filed Mar. 23, 2009, the contents of which are incorporated herein by reference.

BACKGROUND OF THE INVENTION

The present invention generally relates to computer memory systems, and more particularly to a modular mass storage system that enables storage devices to be installed and removed from a computer without the use of cables through which the storage devices receive power and exchange data with the motherboard of a computer system.

Current data (mass) storage devices in personal computers (PCs) and servers typically use rotatable media-based hard disk drives (HDDs) featuring one or more magnetic platters as the data carrier and a read/write head positioned over the relevant sector by means of an actuator. In recent years, the trend has been to miniaturize these HDDs such that currently the largest form factor is the 3.5-inch drive. The 3.5-inch HDDs are still the predominant non-volatile storage device in desktop computers, where they are typically mounted in drive bays. In the notebook sector, the more common HDD is the 2.5-inch drives in a slim form factor mounted in a specialized compartment in the notebook chassis.

Aside from physical dimensions, the weight of an HDD plays an important factor with respect to the mounting of an HDD in a computer, since certain prerequisites must be met for the mounting fixture. Moreover there are also some orientational factors that must be taken into consideration, for example, drives mounted at an angle appear to have higher wear on their bearings than do drives oriented so that their spindle axes are vertical during normal operation of the computer. Finally and significantly, the mass of the actuator is often sufficient to cause some degree of movement of the entire drive. Primarily because of these weight and stability concerns, HDDs are often mounted in specialized drive bays within the chassis, often with the use of rubber grommets to dampen vibrations and shock between the HDDs and the chassis. Power and data connections are made through cables to the motherboard or any add-on host-bus controller, as well as the power supply unit (PSU) of the computer.

The introduction of solid state drives (SSDs) into the computer market has lessened and in some cases eliminated some of the above-noted concerns associated with HDDs. SSDs are slimmer, lighter and lack moving parts, and therefore their operation is intrinsically vibration-free and they have almost unlimited shock resistance. Likewise, SSDs are not sensitive to orientation whatsoever. As such, SSDs allow for a wide spectrum of mounting methods for computer systems.

Redundant arrays of independent disks (RAID), which encompass computer data storage schemes that divide and replicate data among multiple HDDs, utilize a dedicated controller, such as an ISA (industry standard architecture) bus or a PCI (peripheral component interconnect) or PCI express (PCIe) expansion card. Since the introduction of Serial ATA (advanced technology attachment), or SATA, several chipset manufacturers have added RAID functionality to their I/O controllers and Southbridges (also known as I/O controller hub (ICH) or a platform controller hub (PCH)). These RAID controllers provide a software-based RAID logic, which is sufficient for RAID Levels 0 and 1 (striping and mirroring, respectively) or a software-based RAID Level 5 configuration with distributed parity in which the central processing unit (CPU) handles the parity calculations. In either case, several HBA (host bus adapter) interfaces or channels are using a unified upstream signal path to the system memory for direct memory access (DMA), in which the HBA acts as bus master to initiate the data transfers.

In another approach, Fusion-io recently introduced a PCIe-based RAID card with onboard, fully-integrated multiple arrays of NAND chips. Advantages of this approach are that the PCIe interface provides a large amount of bandwidth to the system logic, and the NAND chips are not interfaced through additional cabling and logic but instead are addressed directly through an integrated controller on the card. Despite its technical elegance, there are certain concerns regarding this technology in its current form. Regarding its implementation, because the device is fully integrated instead of modular, any component failure will render the entire device inoperable. From a consumer viewpoint, because the device is at present a single-source solution, any major acceptance in the market is handicapped by a supply monopoly, and pricing may be prohibitive for wide distribution.

In view of the above, it would be desirable if further solutions were available that are capable of combining the possibilities of new generations of drives with a modular design in which off-the-shelf components can be used in any combination desired by the owner, providing a level of expandability, flexibility and serviceability at the lowest total cost of ownership.

BRIEF DESCRIPTION OF THE INVENTION

The present invention provides a modular mass storage system and method that enables cableless mounting of ATA and/or similar high speed interface-based mass storage devices in a computer system.

According to a first aspect of the invention, the modular mass storage system includes a printed circuit board, a system expansion slot interface on the printed circuit board and comprising power and data pins, a host bus controller on the printed circuit board and electrically connected to the system expansion slot interface, docking connectors connected with the host bus controller to receive power and exchange data therewith and adapted to electrically couple with industry-standard non-volatile memory devices without cabling therebetween, and means on the printed circuit board for securing the memory devices thereto once coupled to the docking connectors.

According to a second aspect of the invention, the method involves installing a mass storage system on a computer system. The mass storage system comprises a printed circuit board, a system expansion slot interface on the printed circuit board and comprising power and data pins, a host bus controller on the printed circuit board and electrically connected to the system expansion slot interface, docking connectors connected with the host bus controller to receive power and exchange data therewith and adapted to electrically couple with industry-standard non-volatile memory devices without cabling therebetween. Industry-standard non-volatile memory devices are then installed in the mass storage system by removably coupling the memory devices to the docking connectors and removably securing the memory devices to the printed circuit board.

In view of the above, it can be seen that the invention features means for mechanically and electrically integrating compliant mass storage devices as daughter devices or modules on a parent expansion card. A technical effect of this invention is the elimination of cabling as a result of direct mounting of individual drives on a RAID adapter. The invention promotes a compact design of an entire mass storage device, as well as a modular design capable of using off-the-shelf drives to allow for customized configuration. As a result, in the event of a failure of any individual device, the failed device can be replaced inexpensively without losing the entire mass storage device. If redundancy is used, an entire array of mass storage devices can be rebuilt on the fly without data loss. Furthermore, a direct PCI/PCIe interface can be used to allow for high data transfer rates. From an economics standpoint, an additional advantage is the ability to use multiple vendor standard devices, eliminating concerns associated with single-source solutions such as the Fusion-io card.

Other aspects and advantages of this invention will be better appreciated from the following detailed description.

DETAILED DESCRIPTION OF THE INVENTION

The present invention provides a compact, fully-integrated, modular mass storage system 10 for computer systems. In the embodiment depicted in FIGS. 1 and 2, the mass storage system 10 is generally configured as a host bus adapter (HBA) comprising an expansion card 12, represented in FIGS. 1 and 2 as a PCI express (PCIe) expansion card, on which an array of data (mass) storage devices 14 associated with the host bus adapter are individually removably mounted. The electronics of the host bus adapter serve to connect the storage devices 14 to a computer (not shown) or other host system. The storage devices 14 may be ATA and/or similar high speed interface-based mass storage devices having commonly-utilized mass memory drive configurations, including but not limited to IDE (integrated drive electronics) mode, advanced host computer interface (MCI), and RAID Levels 0, 1, 10 and 5.

Figure 1:
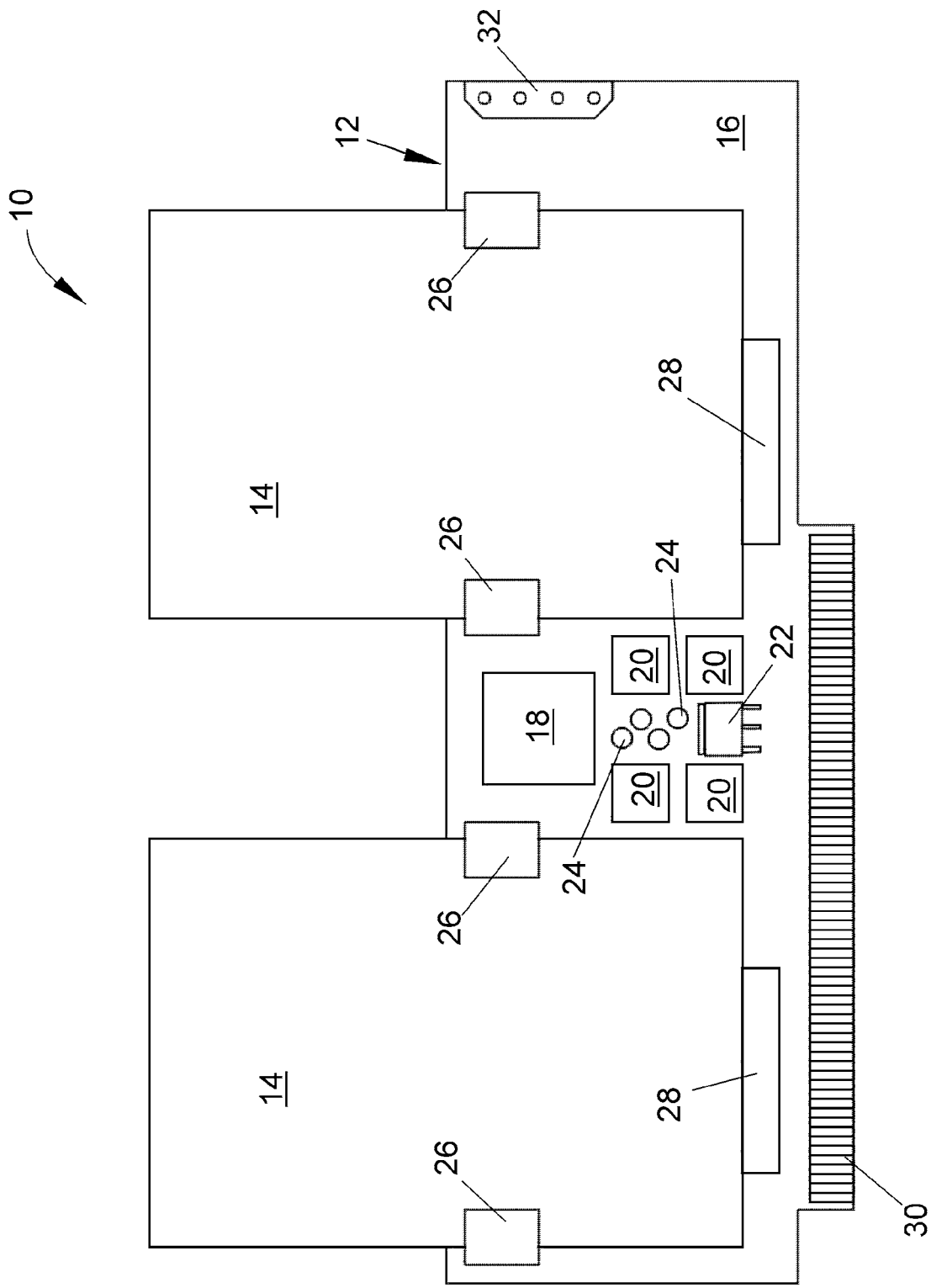
FIG. 1 is a schematic overview of a modular mass storage system for computer systems according to an embodiment of the present invention, wherein the system is configured as a host bus adapted that includes multiple mass storage devices (drives) removable engaged with docking connectors.
Figure 2:
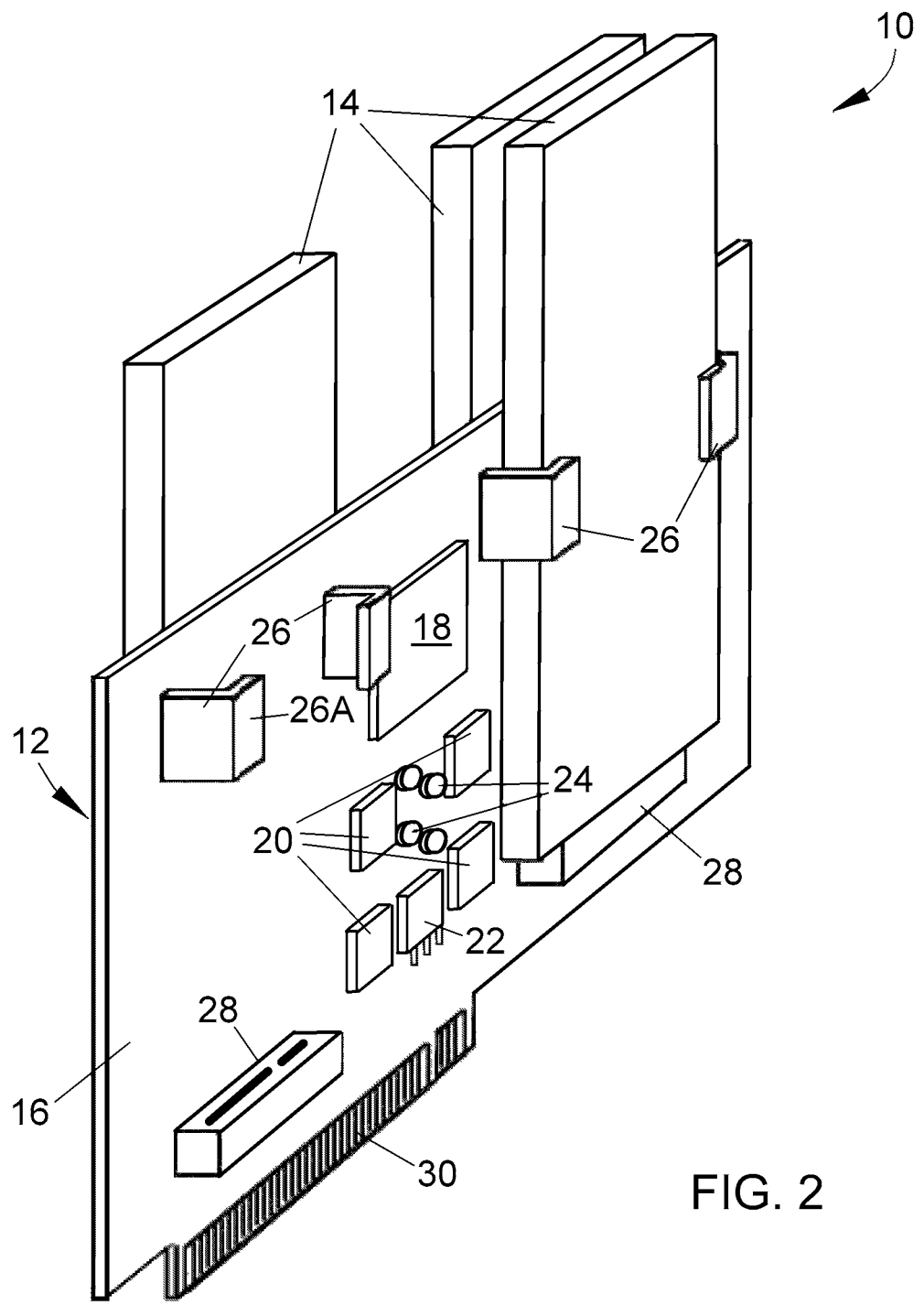
FIG. 2 is a perspective view of the modular mass storage system of FIG. 1, with one of the drives removed to illustrate the mounting and interface to the drives.

The expansion card 12 in FIGS. 1 and 2 comprises a printed circuit board 16 on which are the electronics of the host bus adapter are mounted, which in FIG. 1 includes a RAID controller 18 along with auxiliary electronics such as a data cache 20 of integrated circuit memory devices such as SDRAM (synchronous dynamic random access memory), SRAM (static random access memory) or pipeline burst SRAM chips for data buffering, and a voltage regulator module represented as including a MOSFET 22 and capacitors 24. In the case of RAID Level 5, parity calculations can be carried out in software using the central processor on the computer system motherboard (not shown) or a dedicated parity processor (not shown) on the card 12. The card 12 is further represented as comprising mechanical retention brackets 26 that secure the mass storage devices 14, represented in FIG. 1 by four SSDs and/or HDDs drives. The storage devices 14 have male connectors (not shown) by which they are directly plugged into female docking connectors 28 on the card 12. The connectors 28 preferably provide both power and data connections for the storage devices 14, similar to SATA drives. The data cache 20 is used to buffer writes and/or prefetch reads from the array of storage devices 14. A system expansion slot interface 30 in the form of a PCIe edge connector provides an interface with an expansion slot of the motherboard for supplying power to the card 12 and exchanging data between the card 12 and motherboard. An auxiliary power connector 32 is also shown by which additional power can be supplied to the card 12, if so desired. Electrical connections (not shown) on the card 12 can be achieved in accordance with conventional industry practices.

FIG. 2 represents a perspective view of the system 10 of FIG. 1, with one of the storage devices 14 removed to illustrate the mounting and interface of the storage devices 14 with the docking connectors 28 and retention brackets 26. As evident from FIG. 2, both sides of the card 12 can carry storage devices 14, as well as their connectors 28. The retention brackets 26 provide the mechanical stability required for the storage devices 14 on the card 12, and serve as mechanical fixtures that help to align each individual device 14 as it is inserted into its docking connector 28. As such, the brackets 26 are preferably somewhat pliable and configured to allow the storage devices 14 to slide between distal arms 26A (FIG. 2) of the brackets 26 in a direction parallel to the surface of the printed circuit board 16 while applying sufficient force normal to the board surface to secure the storage devices 14 against the board surface.

The number of docking connectors 28 can vary, depending on the length of the card 12. In the embodiment of FIGS. 1 and 2, four docking connectors 28 are shown though it should be understood that any number of connectors 28 could be provided, including a single connector. Because of the bandwidth requirements of the card 12 and its storage devices 14, the expansion slot interface 30 will typically use eight lanes for signaling, though a single lane, four lanes or sixteen lanes are also possible.

As evident from FIGS. 1 and 2, the docking connectors 28 and expansion slot interface 30 provide for cableless mounting and interfacing of the multiple mass storage devices 14. Because it is advantageous to keep the amount of external cabling at a minimum, the power connections of the expansion slot interface 30 preferably use the full length of the interface 30, even if the data connections only use a fraction of the lanes available. The optional auxiliary power connector 32 on the card 12 can be used to supply auxiliary power from the system's motherboard to the card 12 independent of power supplied to the card 12 by the interface 30.

In view of the above, it can be seen that the mass storage system 10 can be installed on a motherboard of a computer before and after installing and securing the storage devices 14 on the card 12. It can also be seen that one or more of the storage devices 14 can be removed from the mass storage system 10 by simply uncoupling the device 14 from its corresponding docking connector 28.

It should be understood that other types of mass storage devices could be used in place of the ATA storage devices 14 identified in reference to the embodiment of FIGS. 1 and 2, For example, USB (Universal Serial Bus) flash (thumb) drives may be mounted in one or more of the docking connectors 28 of the expansion card 12 in a manner similar to what is shown in FIGS. 1 and 2 and described above. This configuration may become more attractive with the emergence of the USB Revision 3.0 "Superspeed" standard (USB 3.0). Other types of devices or protocols are also possible, nonlimiting examples of which include HDMI (high-definition multimedia interface), IEEE 1394 interface (e.g., Apple's FIREWIRE), and SO-DIMMs (small outline dual in-line memory modules) using non-volatile memory components are also within the scope of this invention.

While the invention has been described in terms of a specific embodiment, it is apparent that other forms could be adopted by one skilled in the art. For example, the physical configuration of the card 10 and its components could differ from that shown. Therefore, the scope of the invention is to be limited only by the following claims.

The invention claimed is:

1. A mass storage system for a computer system, the mass storage system comprising:
   - a printed circuit board;
   - a system expansion slot interface on the printed circuit board and comprising power and data pins;
   - a host bus controller on the printed circuit board and electrically connected to the system expansion slot interface;
   - docking connectors adapted to electrically couple with industry-standard non-volatile memory devices without cabling therebetween, the docking connectors being connected with the host bus controller to receive power and exchange data therewith; and
   - means on the printed circuit board for securing the memory devices thereto once coupled to the docking connectors.

2. The mass storage system according to claim 1, wherein the system expansion slot interface is a PCIe connector.

3. The mass storage system according to claim 2, wherein the power and data pins conform to female SATA connectors, eSATA connectors, USB connectors, HDMI connectors, IEEE 1394 interface connectors or SO-DIMM sockets.

4. The mass storage system according to claim 1, wherein the host bus controller is configured as a RAID controller.

5. The mass storage system according to claim 4, wherein the host bus controller comprises onboard SDRAM, SRAM or pipeline burst SRAM used as data cache.

6. The mass storage system according to claim 4, wherein the host bus controller comprises onboard logic capable of carrying out parity calculations for the RAID controller.

7. The mass storage system according to claim 1, further comprising the memory devices secured to the printed circuit board and coupled to the docking connectors.

8. The mass storage system according to claim 7, wherein the memory devices comprise at least one solid state drive.

9. The mass storage system according to claim 7, wherein the memory devices comprise at least one hard disk drive.

10. The mass storage system according to claim 7, wherein the memory devices comprise at least one USB 3.0 flash drive.

11. The mass storage system according to claim 7, wherein the memory devices comprise at least one SO-DIMM.

12. The mass storage system according to claim 7, wherein the memory devices comprise at least two drives chosen from the group consisting of solid state drives, hard disk drives, USB 3.0 flash drives, SO-DIMMs, HDMI drives, and IEEE 1394 interface drives.

13. The mass storage system according to claim 1, wherein the mass storage system lacks any cables by which the memory devices receive power from and exchange data with a computer motherboard other than through the system expansion slot interface.

* * * * *